(12) United States Patent  
Pettus

(10) Patent No.: US 8,555,666 B1  
(45) Date of Patent: Oct. 15, 2013

(54) SINGLE PACKAGE, INDOOR AIR-SOURCED, BASEMENT HEAT PUMP FOR HOME HEATING AND AIR CONDITIONING

(76) Inventor: Norman Enrique Pettus, Ledyard, CT (US)

( * ) Notice: Subject to any disclaimer, the term of this patent is extended or adjusted under 35 U.S.C. 154(b) by 848 days.

(21) Appl. No.: 12/661,236

(22) Filed: Mar. 11, 2010

Related U.S. Application Data

(60) Provisional application No. 61/209,914, filed on Mar. 11, 2009.

(51) Int. Cl.
*F25B 27/00* (2006.01)
*F25D 23/12* (2006.01)
*F24J 3/08* (2006.01)

(52) U.S. Cl.
USPC .............................. 62/238.1; 62/260; 165/45

(58) Field of Classification Search
USPC ........................ 62/238.1, 260; 165/45, 53–57
See application file for complete search history.

(56) References Cited

U.S. PATENT DOCUMENTS

| 2,559,870 A | | 7/1951 | Gay |
| 2,749,724 A | * | 6/1956 | Borgerd et al. .................. 62/260 |
| 2,986,904 A | | 6/1961 | Williamson |
| 4,598,558 A | | 7/1986 | Bingham |

FOREIGN PATENT DOCUMENTS

JP          2009250581 A    10/2009

* cited by examiner

*Primary Examiner* — Cassey D Bauer

(57) ABSTRACT

Heating and cooling system that uses basement air as a thermal supply for efficient operation of a single-package heat pump, providing means to: (a) channel heat pump exhaust as to promote thermal transfer between said exhaust and the basement slab, using the slab as a geothermal source for sustained heat pump operation, and, (b) enable reconfiguration between heating and air-conditioning modes by modification of air ducting or air routing, with no alteration of the refrigerant cycle internal to the heat pump. The system also provides means allowing the heat pump function to be provided by a low-cost, mass-produced, window air conditioner. The window air conditioner technology leveraged by this invention has, in recent decades, become more efficient and reliable, with more convenient controls, but otherwise, has not substantially changed in form, function, or basic operating technology.

11 Claims, 6 Drawing Sheets

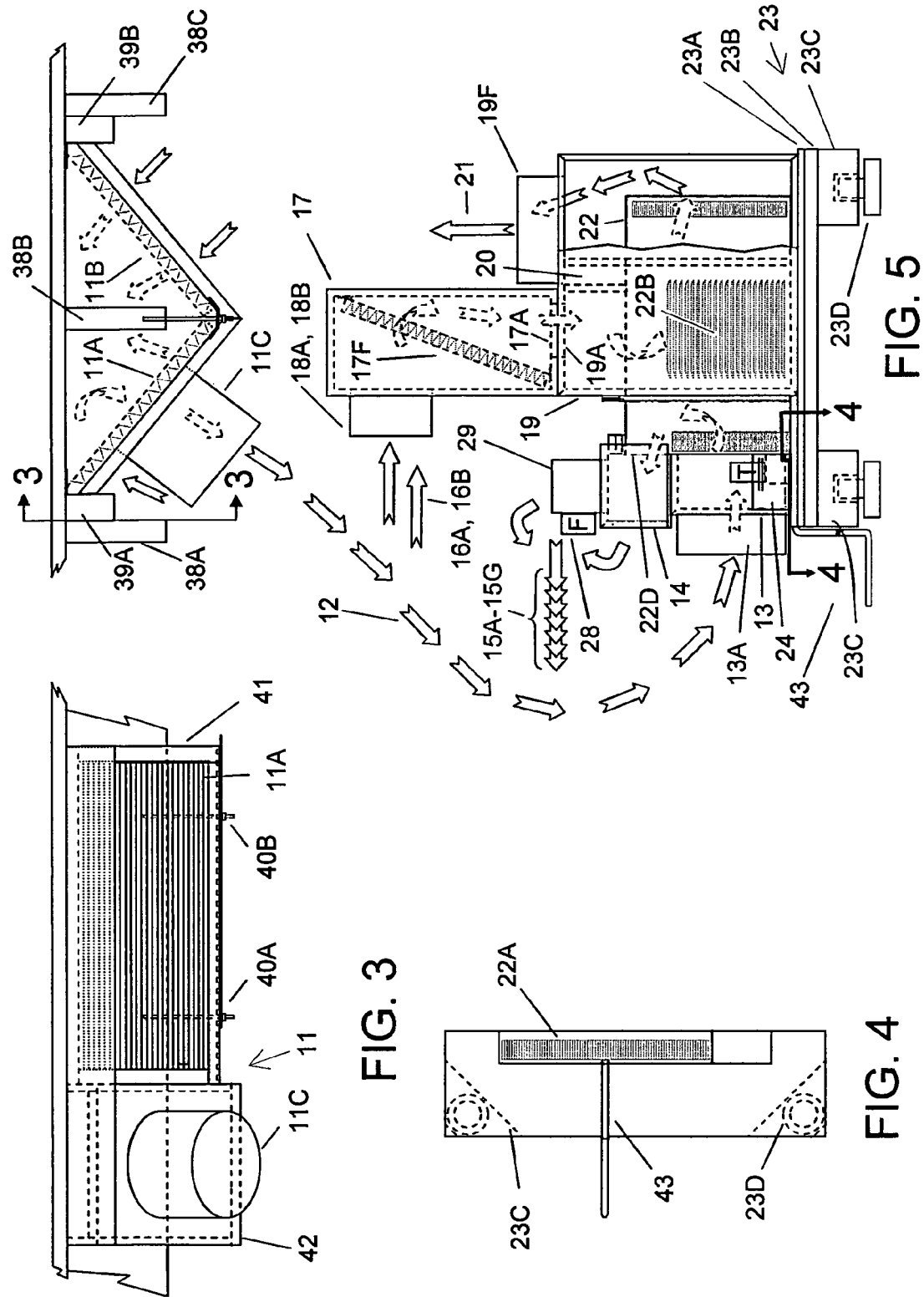

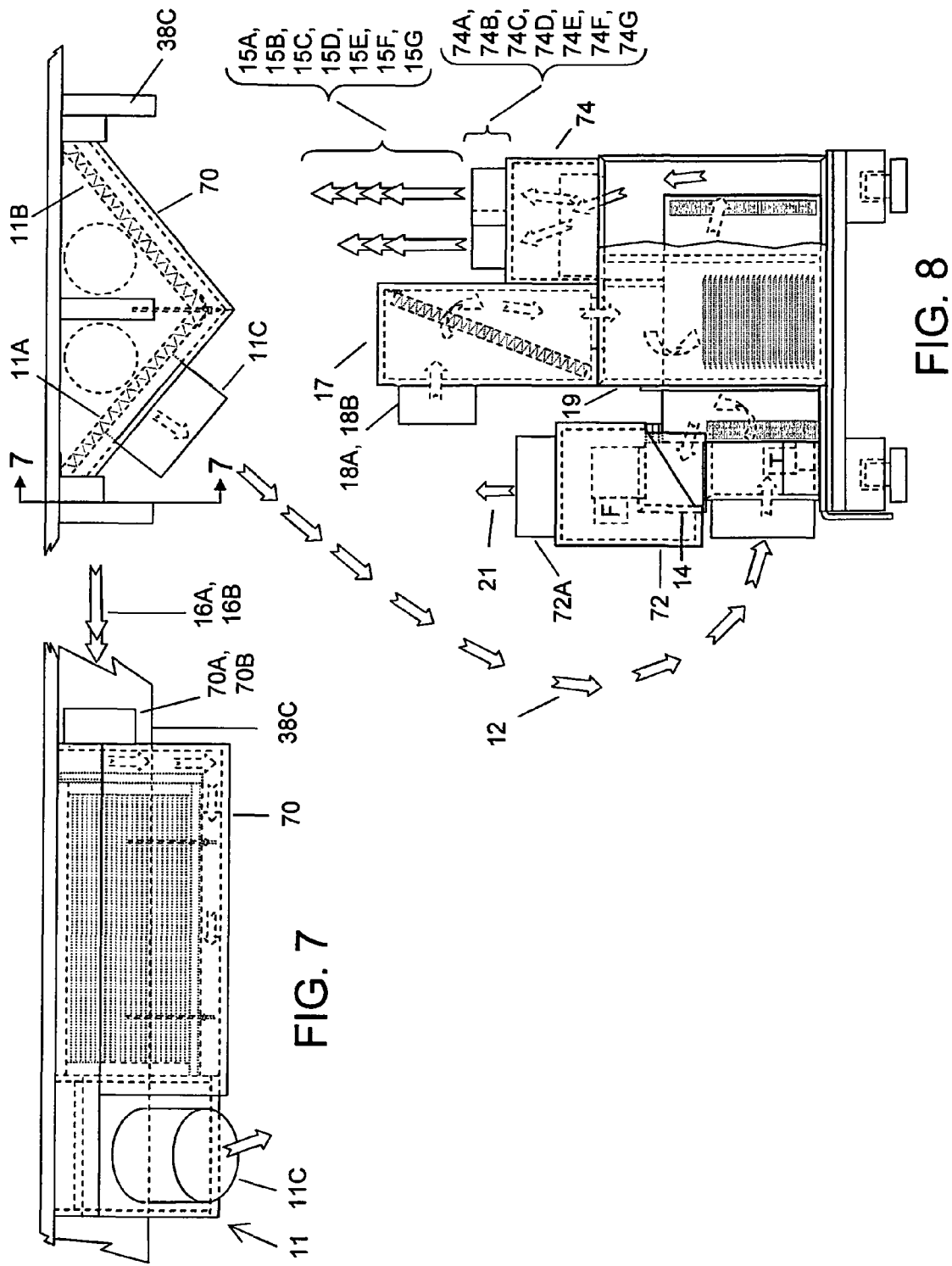

SINGLE PACKAGE, INDOOR AIR-SOURCED, BASEMENT HEAT PUMP FOR HOME HEATING AND AIR CONDITIONING

CROSS-REFERENCE TO RELATED APPLICATIONS

This application claims the benefit of provisional patent application Ser. No. 61/209,914, filed 2009 Mar. 11 by the present inventor.

FEDERALLY SPONSORED RESEARCH

Not Applicable

SEQUENCE LISTING OR PROGRAM

Not Applicable

BACKGROUND

1. Field

This application relates to heat pump systems used for residential heating and air conditioning, specifically for residences having unfinished or partially finished basements, with a concrete slab that is substantially un-insulated with respect to the underlying ground.

2. Prior Art

A wide variety of heat pump-based home heating and air conditioning systems are available on the market, generally using outside air or geothermal sources accessed externally to the house, and employing components having more complexity, higher cost, and lower reliability as compared to the herein-described heat pump system. Heat pump systems thermally sourced to outside air are most common, but lose efficiency in colder weather and, in many cases, have outside evaporator/condenser units that are exposed to weather extremes such as snow and ice. Geothermally-sourced systems are another option, but are expensive, requiring the drilling of wells or deep burying of ducting or long piping loops. Both types of heat pump systems typically incorporate a reverser valve that is used to modify refrigerant flow to select either air conditioning or heating. Systems fed by outside air also need a reverser valve to conduct a defrost cycle that eliminates ice build up in cold weather. Along with their related sensors and controls, reverser valves are responsible for a substantial portion of expensive corrective maintenance associated with heat pumps.

An additional shared characteristic of currently marketed heat pumps is that they exhaust heat outside as part of air conditioning mode, without otherwise employing the hot thermal exhaust for a productive purpose. In particular, existing heat pump systems provide no means to leverage hot exhaust for reduction of basement mold and mildew. This must be considered a shortcoming, since many heat pump system owners are obliged to separately operate a basement dehumidifier in the summer, incurring higher electric bills as a result.

Due to the above described limitations and their associated cost impacts, many homeowners are reluctant to commit to a heat pump system, and are particularly concerned about high initial investment cost, limited rate of return, and the likelihood that they may not own the house long enough to realize a payback.

Specific prior-art designs having limited similarities to the herein-described heat pump system include U.S. Pat. No. 4,598,558 to Bingham, U.S. Pat. No. 2,986,904 to Williamson, and U.S. Pat. No. 2,559,870 to Gay. In all of these patents, the use of a basement or crawl space is addressed as a component element of an overall heating and/or cooling system, but in each case with key differences and disadvantages as compared to the herein-described heat pump system.

Bingham describes a heat pump located indoors but drawing its thermal supply from outside air that is routed through the attic of the home. Bingham's design passes that thermal supply air through the evaporator of a heat pump, and directs the heat pump's thermal exhaust to a crawl space under the house, from where the exhaust stream is vented to outside air. This system is similar to a conventional inside/outside split system in that it requires a reverser valve to modify the flow of refrigerant when changing from heating to air conditioning mode. Reverser valves and the sensors and controls needed to operate them add complexity, purchase cost, and maintenance cost to a heat pump system.

Like Bingham, Williamson describes a heating mode that sources outside thermal supply air via the attic of the home and returns it to the outside as heat pump exhaust. Williamson also provides a means to draw outside air into the basement and then to the heat pump evaporator. Neither Bingham nor Williamson provide a means to concentrate the flow of heat pump exhaust over the basement slab and thereby maximize the effectiveness of the basement slab and underlying ground as a thermal source for heat pump operation.

Gay describes a main floor generally raised above a concrete slab by I-beams, with the space between the I-beams providing a means to channel heat pump exhaust over and across the slab. The heat pump exhaust gains heat from the slab and is then returned to the thermal input of the heat pump by a system of return ducting.

An important limitation of Gay's design is that it does not take full advantage of the thermal characteristics of the basement slab and foundation in order to provide increased geothermal heat flow. External drainage characteristics of basements and their foundations cause increased soil moisture and higher thermal conductivity underlying perimeter and corner areas of the slab. Thermal conductivity is also greater in perimeter and corner areas since heat in these areas can be conducted both vertically and laterally with respect to the foundation. Gay's design does not seek to exploit these characteristics however, and in operation, channels most of the heat pump exhaust over centralized areas of the slab. This is in keeping with a focus of Gay's design which is to obtain heat from a solar source, store that heat into the slab and immediately underlying ground, and recover the stored heat for use as thermal input to a heat pump. Given this focus of Gay's design, maximizing air flow over the perimeter areas of the slab might be counterproductive, since that would cause more rapid dissipation of stored solar heat to the surrounding ground. Since Gay's design does not take advantage of increased thermal conductivity in perimeter and corner areas of the slab, it is not geared to leverage natural ground temperature as a source of heat pump thermal energy.

A second limitation of Gay's design is that it isolates the flow of heat pump thermal exhaust from the basement ambient. More specifically, Gay's design passes thermal exhaust over the slab, and then collects that exhaust flow into a return duct system. The return duct system delivers the exhaust flow directly to the thermal input of the heat pump while at the same time isolating it from basement ambient air. By isolating the flow of thermal exhaust from the basement ambient, Gay's design prevents the heat pump from leveraging heat flows that are present in the basement ambient. These heat flows include: heat escaping from the furnace and water heater, heat from the dryer, waste heat from the heat pump itself, and radiated or conducted heat from the upstairs living space. Using Gay's approach, such heat flows are substantially dedicated to maintaining the basement as a heated space. This provides some indirect warming to the upstairs, but also causes increased heat transfer through the foundation walls. Increased heat loss through foundation walls is unavoidable if maintaining the basement as heated living space is an objective of the homeowner, but if not; this form of added heat loss must be considered a drawback.

In new construction, the system described by Gay would introduce other drawbacks, including substantial material and labor cost associated with the generally raised floor and return duct system. Retrofit to an existing house, Gay's system would entail a substantial modification of internal basement walls to allow for the generally raised floor, re-positioning of existing hard-piped furnace and water heating equipment, as well as a general loss of headroom in centralized walking areas of the basement. Gay also prescribes a concrete-lined trench cut through the slab into the underlying ground and extending transversely across the basement. In operation, this concrete-lined trench distributes exhaust from the heat pump, to the spaces between the I-beams, and over the slab. The construction of such a concrete-lined trench would require considerable excavation and associated cost.

In contrast to Gay's design, the herein-described heat pump system concentrates heat pump thermal exhaust over areas bounding the inside perimeter of the slab, and leverages improved thermal conductivity in those areas to effectively source the heat pump to natural ground temperature. This thermal exhaust flow is then released and directed horizontally across exposed slab in the centralized walking areas of the basement. In heating mode, the released thermal exhaust is relatively cool, and downward convection helps to create additional heat transfer with the slab. After gaining heat energy from the slab, the thermal exhaust flow joins circulating and convective currents in the basement ambient and is eventually re-introduced into the heat pump's thermal air supply input located in the basement overhead. In this manner, the heating mode design of the herein-described heat pump system eliminates Gay's generally raised floor, eliminates Gay's return ducting system, maximizes heat transfer from natural ground temperature via the slab, captures energy from heat flows in the basement ambient for delivery to the upstairs living space, and avoids thermal losses through basement walls that would otherwise occur if basement heat flows were dedicated to warming the basement.

Another key difference between the herein-described heat pump system and other prior-art heat pump systems is that, in summer operation, the herein-described heat pump system does not reject thermal exhaust to outside air, but instead uses that exhaust to prevent basement mold and mildew. This benefit does not arise as part of an add-on function, but is an integral byproduct of how the use of the slab and foundation as a heat sink concentrates the delivery of heat into perimeter areas where mold and mildew are most likely to occur. By preventing mold and mildew, the herein-described heat pump system also improves the usability of the basement for its most prevalent applications as a storage area, laundry, or occasional workshop. In comparison, existing heat pump systems have no similar ability to prevent basement mold and mildew and can oblige the homeowner to separately operate a basement dehumidifier in the summer, with higher electric bills incurred as a result.

The herein-described heat pump system not only replaces the need for a basement dehumidifier, but also uses a method of preventing basement mold and mildew that has advantages over the method used by a conventional basement dehumidifier. When a conventional basement dehumidifier is used, basement humidity is reduced, but the reduction can be very transient in nature. This is because humidity can quickly be re-introduced to the basement by an air flow from the outside or from the upstairs living space. For example, if a water heating furnace or dryer that is fed by ambient basement air is operated, an inflow of replacement air into the basement will result. An inflow of air into the basement may also result if an upstairs window fan operated, creating a pressure differential between the basement ambient and outside air. Given that the slab and foundation surfaces are cooled to near-natural ground temperature, the re-introduction of humid air can enable condensation, and a resultant growth of mold and mildew. Since perimeter areas of the slab and foundation are coolest, mold and mildew growth will generally concentrate in those areas.

Unlike conventional dehumidifiers, the herein-described heat pump system uses floor-level storage platform and ducting structures or "platform ducts" that isolate perimeter areas of the slab otherwise susceptible to mold and mildew. When the system is on, these platform ducts directly expose perimeter areas of the slab to a stream of warmed basement air. Retained warmth will continue to dry the slab for hours after the system is cycled off. When the system is off for long periods, the platform ducting provides air isolation means to prevent condensation and associated mold and mildew.

Some currently marketed heat pump systems are sourced to basement air, but for the purpose of heating water. These products include:

Air Tap produced by Beyond Pollution, Incorporated,
E-Tech Water Heaters produced by Applied Energy Recovery Systems,
Nyletherm produced by Nyle International, and
Hot Water Generator produced by Trevor-Martin.

These units are generally mounted atop or in close proximity to a water heater storage tank and release cold air out in the immediate vicinity of the heat pump, causing it to freely mix with nearby air in the basement. Unlike the herein-described heat pump system, however, these water heating units do not manage their heat pump exhaust by releasing it so that it is separated and stratified in close proximity to the basement slab. As a result, these units have limited effectiveness in drawing geothermal heat from the basement slab. Although suitable for water heating, the units are not suitable for generating a larger amount of heat, such as would be needed to substantially assist home heating. In contrast, the herein-described heat pump system maximizes the geothermal resource provided by the basement slab, is reconfigurable to provide dedicated support for either home heating or air conditioning, and is effective in combating basement mold and mildew as a byproduct of its structure and operation.

BACKGROUND

Advantages

The herein-described heat pump system provides means to redress key short-comings of heat pump systems, which are high initial investment cost, complexity, reduced efficiency in cold weather, the need to operate a separate basement dehumidifier in warm weather, and long payback periods. Advantages of the herein-described heat pump system and resulting benefits relative to the above noted main drawbacks are described below:

1) It supports both heating and air conditioning by modification of air routing, thereby eliminating the need for a reversing valve or associated complex controls.

2) It enables use of a conventional, mass-produced, reliable, and low-cost window air conditioner as a heat pump "engine".
3) It increases the effectiveness of the existing furnace by capturing and recycling heat escaping from the furnace to the basement ambient. If not captured by the heat pump, much of this heat would be lost by parasitic convection to the basement walls or by thermal radiation to the basement slab.
4) It substantially reduces or eliminates the use of the existing furnace in moderately cold weather and enhances and leverages use of the existing furnace in cold weather extremes, thereby providing a substantial reduction in heating cost without requiring the homeowner to finance a full replacement of the existing heating system.
5) It exploits the existing foundation, slab, underlying grade, and surrounding subsurface material and ground as a combined geothermal source during the winter and as a thermal heat sink during the summer, without costly drilling or digging.
6) It's efficiency in heating mode is substantially independent of weather, since evaporator input air is derived from heat pump thermal exhaust that is warmed geothermally, and by heat re-cycled from the basement ambient.
7) It's efficiency in air conditioning mode is substantially independent of weather, since condenser input air is derived from heat pump thermal exhaust that is cooled geothermally via the basement slab.
8) When acting as an air conditioner, it lowers humidity of the upstairs living space, eliminating a source of basement humidity when upstairs air is drawn to the basement by operation of a water heating furnace or dryer.
9) Using specially configured ducting, referred to herein as "platform ducting," it warms perimeter areas of the slab that would otherwise be susceptible to mold and mildew, and using the same means, also provides convenient storage platforms, raised above floor level and warmed from underneath.
10) It reduces the coverage area needed for platform ducting by selectively positioning platform ducts about basement slab inside perimeter, where moisture conditions in the underlying grade and the existing geometry of the foundation allow for optimum heat transfer.
11) It releases heat pump exhaust horizontally from platform ducts and across the slab so as to exploit the stratification of cold air in winter operation, allowing for supplemental heat transfer from exposed areas of the slab in the centralized walking areas of the basement.
12) It amplifies the benefits that result from insulation of the basement walls, windows, and ceiling, allowing the geothermal capacity of the slab to be more fully harnessed by the heat pump.
13) It has a small footprint that allows it to be placed in an unobtrusive location such as under a stairwell.
14) Its surrounding airflow control enclosures and enclosed stairwell location provide for quiet operation.
15) In addition to leveraging geothermal heat via the basement slab and waste heat from the existing furnace, the herein-described heat pump system also advantageously uses a number of other sources of heat that might otherwise be wasted including:
  heat radiated from house flooring and joists in the basement overhead,
  heat escaping to the basement from use of the pre-existing water heating system(s),
  heat from hot water pipes and drain pipes,
  heat from energy saving devices like a drain water heat exchanger,
  heat escaping from heat pump system components including ducting,
  heat re-routed from the bathroom fan or clothes dryer to the heat pump, and
  latent heat from condensation of humidity on the heat pump evaporator.

Due to the above advantages, the herein-described heat pump system is expected to improve the usability of the basement and also provide an earlier payback and earlier reward due to energy savings, as compared to existing heat pump systems currently on the market.

SUMMARY

The herein-described heat pump system supports heating or air conditioning of the living space within a home by providing means to (a) collect air from that living space and deliver it for heating or cooling by a single-package heat pump having an air-fed condenser and an air-fed evaporator, (b) capture the heated or cooled output air emitted by the single-package heat pump and return that output air back to the living space, (c) draw air from the basement ambient and deliver that air for use as a thermal supply to support the heating or air-conditioning function being performed by the single-package heat pump, (e) contain and channel heat pump thermal exhaust so as to promote direct contact of that exhaust against the basement slab, (f) release and direct that thermal exhaust so as to enhance thermal contact with exposed slab in centralized walking areas of the basement, and, (g) enable reconfiguration from heating mode to air-conditioning mode or from air-conditioning mode to heating mode by modification of air routing, thereby eliminating the need for reverser valve means to alter the refrigerant cycle internal to the heat pump.

As an associated feature, the herein-described heat pump system provides means enabling the heat pump function to be provided by a low-cost, mass-produced, window air conditioner operating as an "embedded heat pump". The window air conditioner technology leveraged by the herein-described invention embodiment has, in recent decades, become more efficient and reliable, with more convenient controls, but otherwise, has not substantially changed in form, function, or basic operating technology.

For optimum performance, the heat pump system design described herein benefits from basement wall insulation to reduce heat loss from the basement, and also benefits from insulation of the basement ceiling. Given current energy cost trends, the option of insulating the basement walls and ceiling has already been identified as a worthwhile stand-alone investment, especially since basement heat loss accounts for upwards of 20% of the total space conditioning load (Timusk, 1981).

When used in concert with the herein-describe heat pump system, basement wall insulation does not need to be fully extended to the basement slab. This is because the lower portion of the basement wall is approximately the same temperature as the slab and can also be used as a geothermal source. As shown in FIG. 2A and FIG. 9, an area of exposed wall can be left below the portion of basement wall covered by insulation. In practice, this also allows the insulation system to be more maintainable, since leakage from behind the insulation can be more easily detected if it should occur. If leakage is detected it can typically be addressed by modification of drainage outside the house, before mold and mildew develops in the basement.

DRAWINGS

Figures

In the drawings, closely related figures have the same number but different alphabetic suffixes.

FIG. 1 provides a front perspective view of the embedded heat pump and interfacing components. This figure indicates ducted airflow by directed arrows. The figure depicts air handling components providing means to configure and enable the heat pump to support home heating.

FIGS. 2A and 2B provide perspective views of "platform ducting" means to channel the exhaust of thermal supply air from the single-package heat pump, so as provide substantial direct contact with the basement slab.

FIG. 3 shows means providing an intake and filter for evaporator input air.

FIG. 4 shows a top view of condensate drain provisions.

FIG. 5 shows a side view of the embedded heat pump and interfacing components, as well as an end-view of the same air intake means depicted by FIG. 3.

Figure 6:
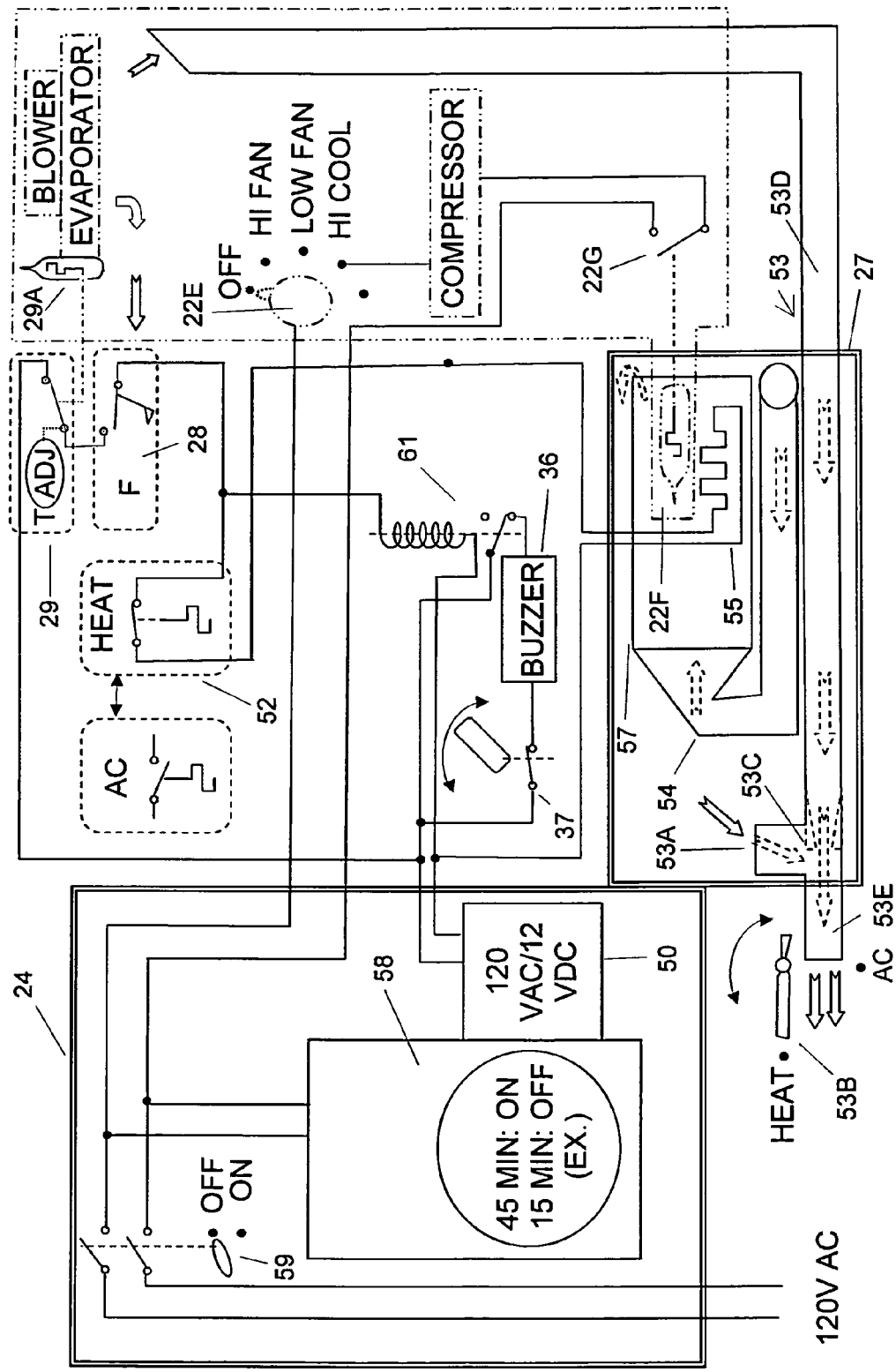

FIG. 6 provides a schematic of control components for the single-package heat pump.

FIG. 7 and FIG. 8: These figures provide views of the embedded heat pump and interfacing components when the system is configured for air conditioning.

Figure 9:
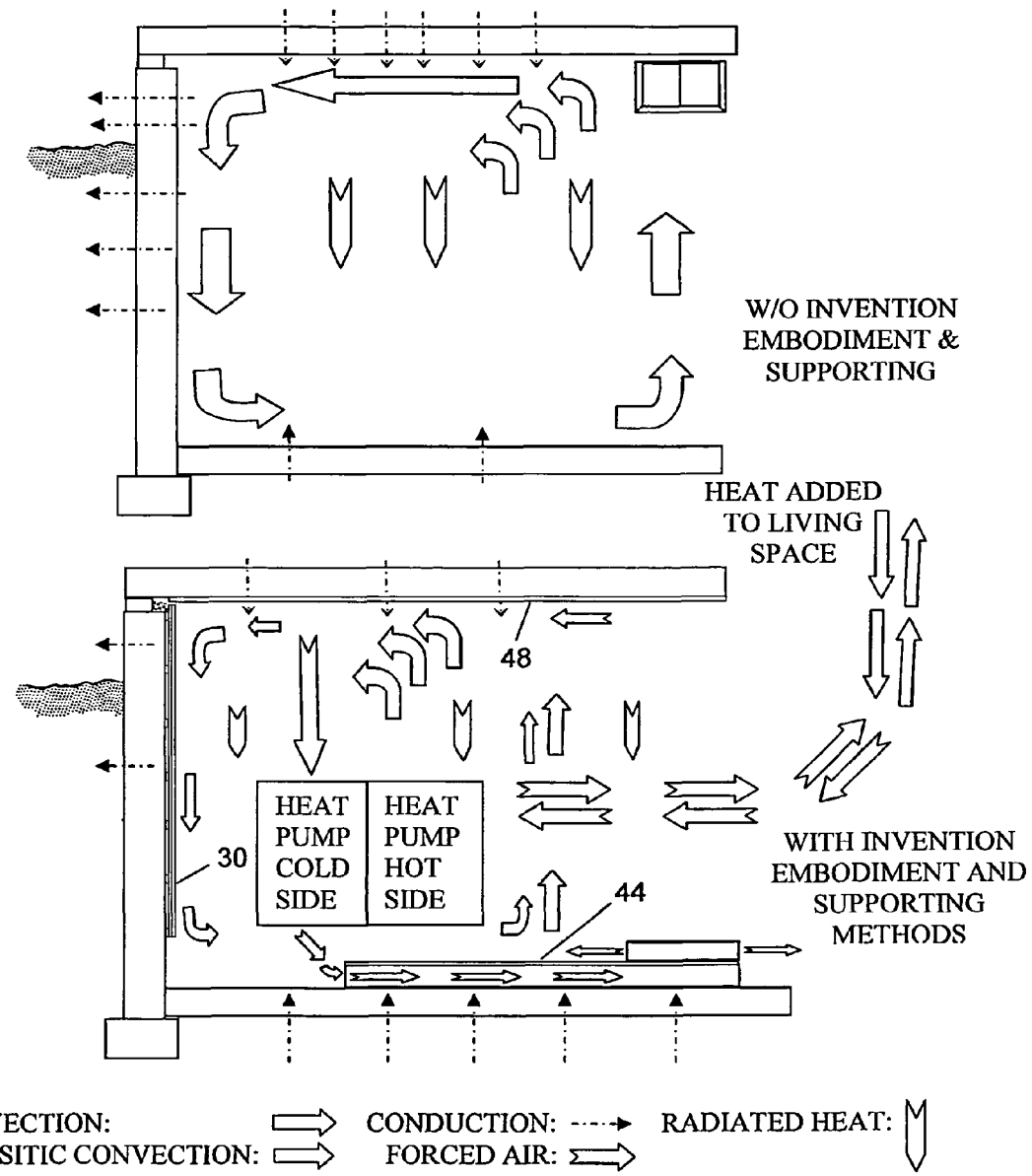

FIG. 9 depicts operation of the herein-described heat pump system as it interacts with basement heat flows, and illustrates use of supporting insulation and air handling methods.

DETAILED DESCRIPTION

The herein-described heat pump system has "cold-side" components, "hot-side" components, control components, an incorporated window Air Conditioner (A/C) referred to herein as a "single-package heat pump" or "embedded heat pump" and "platform ducting" also referred to as "thermal exhaust temperature mitigation means."

The embedded heat pump used by the herein-described heat pump system is sized according to the amount of available heat to be captured from the basement slab and other available sources. The conventional window A/C design applied as the embedded heat pump incorporates a cold-side blower and hot-side fan installed on a common shaft driven by a single electric motor, with a single Freon piping loop connecting an evaporator, compressor, condenser, and expansion valve. As is typical for a window A/C of conventional design, the unit also has a temperature bulb-driven electrical control that closes on rising temperature, causing the compressor to cycle on.

All enclosures depicted in the figures and interfacing to the embedded heat pump are routed to 45 degrees at their joining edges for additional strength. Enclosures are insulated where they serve to contain hot or cold air emitted by the embedded heat pump. Enclosures are un-insulated where they serve to contain air inflow to the embedded heat pump. For the current embodiment, un-insulated enclosures use ½" particle board, which can be joined and strengthened using a variety of basic carpentry techniques. Latex paint is applied on both inner and outer surfaces. Insulated enclosures for the present embodiment are constructed with ½" polyisocyanurate rigid foam board having a foil-coated inner surface. For added strength, an external adhesively applied layer of aluminum flashing is also used. Ducting is indicated in the figures by directed arrows showing the resulting air pathways established. The present embodiment uses fiberglass insulated R-6.0 flexible air ducts in 4-inch, 6-inch, and 8-inch diameter sizes as noted where applicable in the following discussion of the drawing figures.

Figure 1:
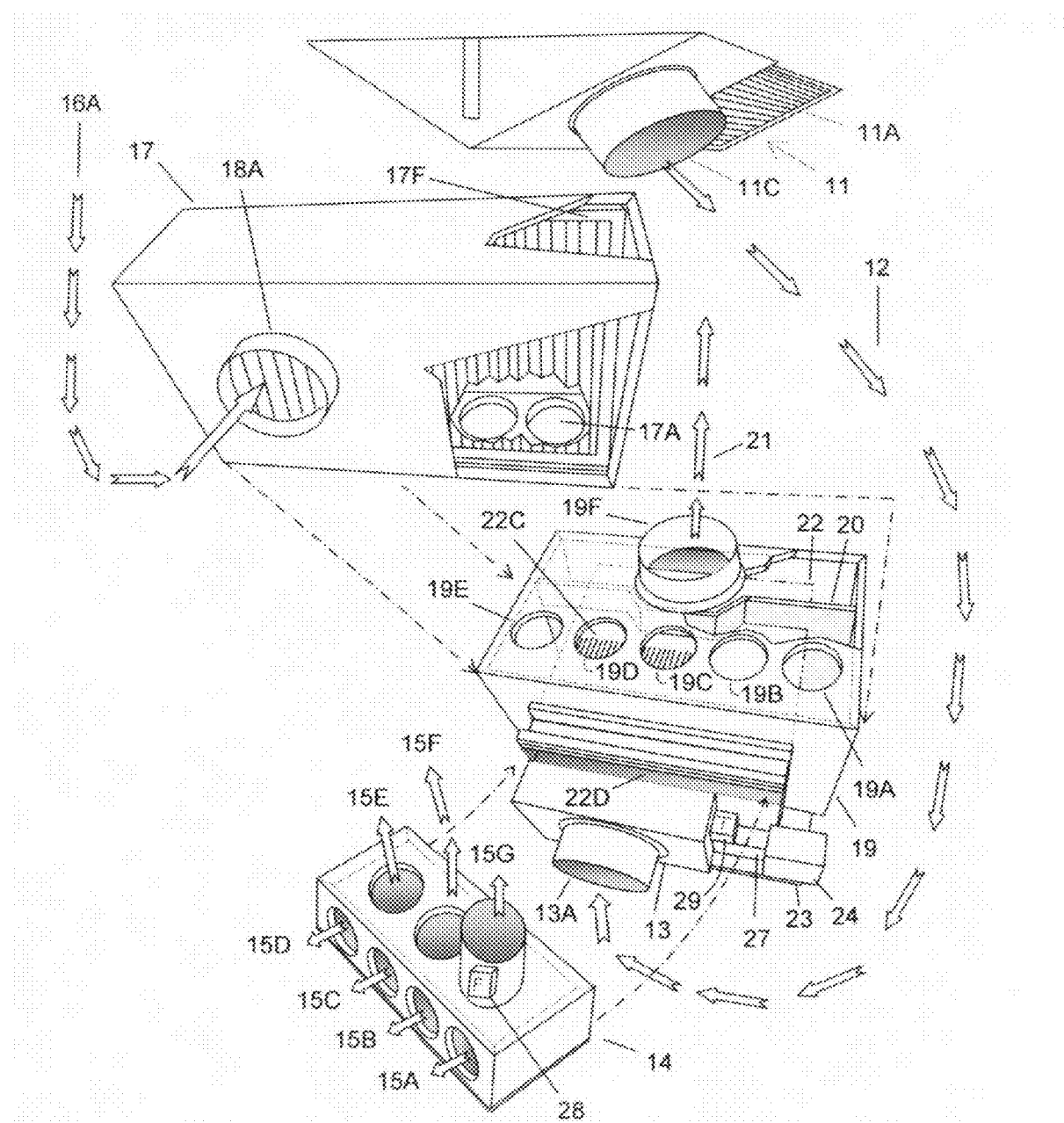

Cold-side component assemblies immediately interfacing to the embedded heat pump are depicted by FIG. 1 and are referred to in the claims as an "evaporator intake assembly" and an "evaporator output assembly." The evaporator intake assembly comprises an "evaporator intake stage and enclosing means" and an "evaporator intake aperture means". In like fashion, the evaporator output assembly comprises an "evaporator output stage and enclosing means" and "evaporator output aperture means". The following discussion relates these terms to specific comprising components of the depicted embodiment.

The evaporator intake stage and enclosing means is depicted in FIG. 1 and comprises an evaporator inlet enclosure 13. The aforementioned evaporator intake aperture means comprises an evaporator inlet fitting 13A. The evaporator inlet fitting 13A connects to an 8-inch diameter evaporator intake duct 12, not drawn in detail but implied by directed arrows showing the associated air pathway. The evaporator intake duct 12 connects to a cold-side filter box outlet fitting 11C mounted on a cold-side filter box 11, which is located in the basement overhead.

The evaporator output stage and enclosing means comprises an evaporator outlet enclosure 14 shown removed from embedded heat pump 22 in FIG. 1. A set of seven 4-inch diameter heat pump exhaust ducts 15A through 15G are shown connecting to the evaporator outlet enclosure 14. These ducts are not drawn in detail in FIG. 1 but are implied by directed arrows. The interfacing holes that accept the heat pump exhaust ducts 15A through 15G comprise the evaporator output aperture means referred to in the claims. When moved into place as indicated by the dotted lines in FIG. 1, the evaporator outlet enclosure 14 is positioned atop the evaporator inlet enclosure 13, so as to receive air from cold air outlet 22D of the embedded heat pump 22.

Hot-side component assemblies interfacing to the embedded heat pump are depicted by FIG. 1 and are referred to in the claims as a "condenser intake assembly" and a "condenser output assembly." The condenser intake assembly is further described as comprising a "condenser intake stage and enclosing means" and a "condenser intake aperture means". In like fashion, the condenser output assembly comprises a "condenser output stage and enclosing means" and a "condenser output aperture means." The following discussion relates these terms to specific comprising components of the depicted embodiment.

As depicted by FIG. 1, a hot-side enclosure 19 is divided by a hot-side partition 20 into a forward section and a rear section. The forward section encloses hot-side air intake grilles of the embedded heat pump 22, such as an embedded heat pump top intake grille 22C and, a side intake grille 22B shown in FIG. 5. The rear section of hot-side enclosure 19 encloses the rear portion of the embedded heat pump 22 including the rearward face of the condenser. The condenser intake stage and enclosing means referred to in the claims comprises the forward section of hot-side enclosure 19. The condenser intake aperture means referred to in the claims comprises a set of five holes 19A through 19E shown in FIG. 1.

Additional hot-side components include a 6-inch diameter intake duct 16A, a hot-side intake fitting 18A, a hot-side filter enclosure 17, a hot-side air filter 17F, a hot air outlet fitting 19F, and an output duct 21. A second intake duct 16B and a second hot-side intake fitting 18B (similar to 16A and 18A) exist as noted in FIG. 5, but are omitted from FIG. 1 to provide the cutout view shown.

Hot-side filter enclosure 17 mounts atop the forward section of hot-side enclosure 19, allowing air to pass through a hole 17A into the forward section of hot-side enclosure 19 via the hole 19A. Additional air flows pass in similar fashion through the four holes 19B through 19E shown immediately to the left of the hole 19A.

The condenser output stage and enclosing means referred to in the claims comprises the rear section of hot-side enclosure 19. The condenser output aperture means referred to in the claims comprises the hot air outlet fitting 19F.

FIG. 1 also shows a control enclosure 24 and a temperature bulb override enclosure 27, which contain embedded heat pump control circuit components. An adjustable evaporator temperature switch 29 is mounted directly atop the temperature bulb override enclosure 27 and is marked "T" in FIG. 1. An evaporator airflow switch 28, is marked "F" in FIG. 1, and is mounted on the evaporator outlet enclosure 14. Control components are discussed in more detail with regard to FIG. 6.

Figure 2A:
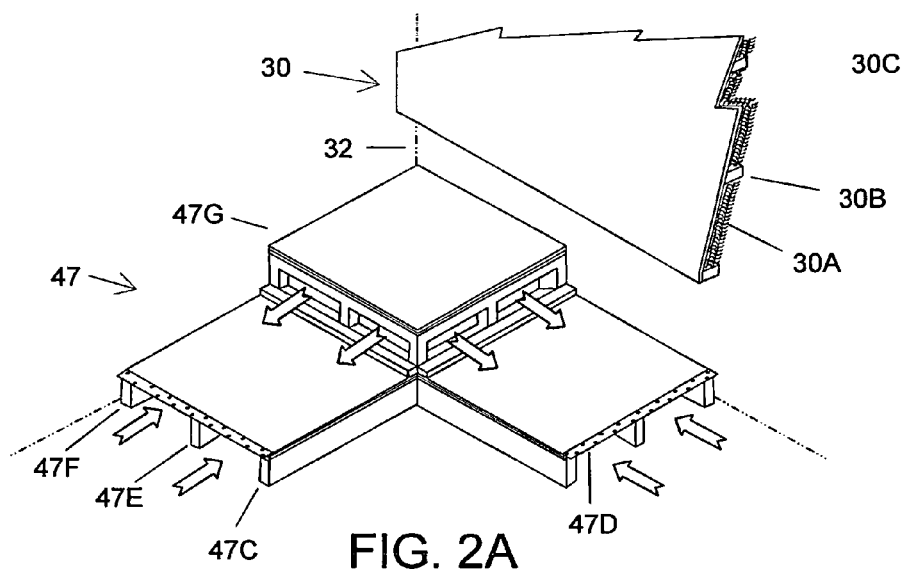
Figure 2B:
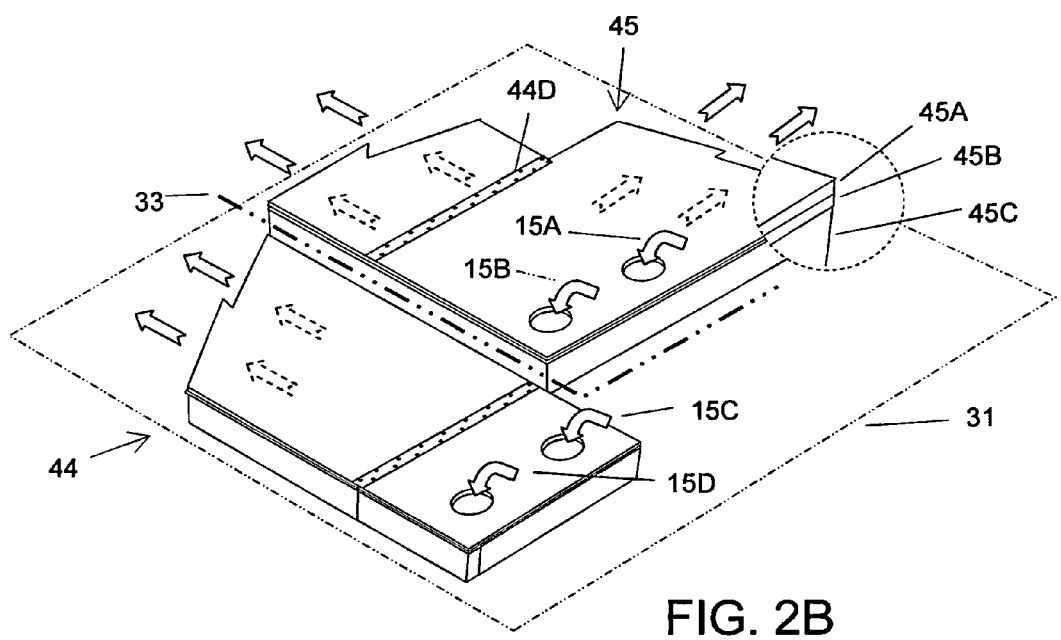

FIG. 2B depicts floor-level ducts that also serve as storage platforms, and are referred to herein as "platform ducting." This platform ducting is generally described in the claims as a "thermal exhaust temperature mitigation means." The claims further identify that the thermal exhaust temperature mitigation means comprises a thermal exhaust plenum, and a thermal exhaust outlet means. The following paragraphs associate these terms to comprising elements of the platform ducting described herein.

A platform duct section 45 and a platform duct section 44 are depicted in FIG. 2B on opposite sides of an internal basement wall 33, which is represented by a dotted line. Platform duct sections such as these comprise the "thermal exhaust plenum" referred to in the claims. Platform duct section 45 receives the outlet end of the heat pump exhaust ducts 15A and 15B, and in like fashion, platform duct 44 receives the outlet end of the heat pump exhaust ducts 15C and 15D. It is implied that similar platform duct sections receive the output of the remaining heat pump exhaust ducts 15E through 15G, previously shown in FIG. 1. Comprising components of platform duct section 45 include a platform duct upper surface 45A, a platform duct insulating panel 45B, and a platform duct support rail 45C, which provides separation with basement slab 31.

As depicted by FIG. 2A, a corner section of platform ducting 47 is located in a corner area of the basement, in close contact with concrete basement wall 32. As shown for the platform ducting corner section 47, all platform ducting is open along its underside to the basement slab and is separated from the slab by an arrangement of platform duct support rails such as 47F, 47E, and 47C. Sealing means such as weather stripping and caulking are used underneath each support rail to prevent air escaping from any gaps between the underside of the support rail and the upper surface of the basement slab. Platform duct 47 also includes a raised air outlet 47G with air release vents that are elevated above the upper surface of adjacent sections of thermal exhaust plenum. The depicted raised air outlet 47G and other similarly configured raised air outlets comprise the "thermal exhaust outlet means" identified in the claims.

Platform duct sections are joined together by commercially available metal tie straps such as 47D, which have two rows of screws allowing them to join abutting and unsupported sheets of plywood or particle board. Selected materials usable for the platform ducts include 2×4 studs used as support rails, ½-inch particle board used as platform duct upper surfaces, and ⅜-inch fan-fold underlayment foam board used as platform duct insulating panels. Drywall screws are used to secure the platform duct upper surface to the underlying support rails, so as to sandwich the ⅜-inch foam insulating panel. This construction is depicted by the magnified view in FIG. 2B showing the platform duct upper surface 45A, the platform duct insulating panel 45B, and the platform duct support rail 45C. Construction of platform ducting is not limited to the above described materials, since the basic structure and function can be provided using a variety of materials and strengthened using a variety of basic carpentry techniques.

FIG. 5 supplements FIG. 1 by showing a side view of the present embodiment with a cutaway in hot-side enclosure 19 to reveal details of internal air flow. As in FIG. 1, the depicted components and ducting are configured to support home heating rather than air conditioning. FIG. 5 also depicts the supporting platform 23 for the embedded heat pump, comprising an insulating panel 23A, a supporting platform top sheet 23B, a set of four supporting platform legs 23C, and a set of four adjustable feet 23D. Adjustable feet 23D allow the embedded heat pump assembly to be tilted forward so that condensate will drip from the forward end by means of an evaporator drainpipe 43. FIG. 4 shows a top view of the evaporator drainpipe 43, which receives condensate from a hole drilled in the bottom of an evaporator condensate collection liner 22A, or from another suitable location to access condensate generated by the evaporator.

FIG. 3 shows a side view of the cold-side filter box 11, which supplements the end view of the cold-side filter box 11 included in FIG. 5. Components of the cold-side filter box 11 include a cold-side filter 11A, and a cold-side filter 11B, which are suspended from a center floor joist 38B, by a set of threaded rods 40A and 40B. These rods place the air filters 11A and 11B in compression, respectively securing the upper side of each against a spacer block 39A and a second spacer block 39B, with spacer blocks 39A and 39B respectively held in place by floor joists 38A and 38C. With reference to FIG. 3, the cold-side filters 11A and 11B are sealed at their right end by a triangular panel 41, and at their left end by a triangular air intake box 42.

FIG. 6 depicts a set of control components for the herein-described heat pump system. The control components comprise a power cut-off switch 59, an adjustable timer 58, a 120VAC-to-12VDC transformer 50, all located inside the control enclosure 24. As noted previously in the discussion of FIG. 1, the control enclosure 24 is adjacent to the temperature bulb override enclosure 27. With reference to FIG. 6, the temperature bulb override enclosure 27 contains a temperature bulb override heater 55, which is located adjacent to a temperature bulb 22F of the embedded heat pump. In this case, a conventional window air conditioner is used has the embedded heat pump referred to herein, providing the temperature bulb 22F connected by a flexible line and mounted external to the evaporator. As is typical for many window air conditioners sold commercially, the temperature bulb 22F is associated with a set of driven contacts 22G that close so as to activate the compressor when temperature rises beyond a user-controlled set point. This arrangement allows interfacing to the air conditioner controls with minimal changes.

To produce the arrangement represented in FIG. 6, the location of the temperature bulb 22F is adjusted away from the evaporator by bending its attaching flexible line (not shown), and moving the temperature bulb so that it is located within temperature bulb override enclosure 27. The thermostat override heater is made by joining a suitable number of ½ watt composite resistors in series to form a combined resistance of approximately 74 ohms. This series resistor collection is sealed in a layer of heat shrink tubing (not shown). The temperature bulb 22F is co-located with the thermostat override heater in a glass tube 57, open at both ends, approximately 4 inches long, and having a ¾ inch diameter. One end of the glass tube is attached to a temperature bulb override vent tube 54 of approximately ½ inch diameter using a heat shrink wrap. The opposite end of the temperature override vent tube 54 is extended through a hole in the temperature bulb override enclosure 27, enabling it to draw air from the basement ambient.

A separate tubing assembly, referred to as an evaporator air tap 53 also interfaces with temperature bulb override enclosure 27. Evaporator air tap 53 is comprised of an evaporator air tap inlet tube 53D, a T-connection 53A, a circumferential restrictor 53C, an evaporator air tap outlet tube 53E, and a two-position air tap shut-off valve 53B. The evaporator air tap inlet tube 53D extends from inside the evaporator outlet enclosure 14 (shown in FIG. 1) into the interior of the temperature bulb override enclosure 27 where it connects to one of the horizontally-opposed ends of T-connection 53A. The opposite horizontally-opposed end of T-connection 53A connects to an evaporator air tap outlet tube 53E that extends outside the temperature bulb override enclosure 27. The air tap shut-off valve 53B is mounted on the end of the evaporator outlet tube 53E allowing air escaping the exposed end of the evaporator outlet tube 53E to be shut off. The evaporator air tap piping is comprised of ½-inch plastic tube. The circumferential restrictor 53C extends midway into the T connection 53A, limiting the diameter of the evaporator air trap piping at that point to 0.375 inches.

Also depicted in FIG. 6 are other control components including a heating and air conditioning thermostat 52, the evaporator airflow switch 28, an embedded heat pump control switch 22E, and the adjustable evaporator temperature switch 29. The adjustable evaporator temperature switch 29 has a remote temperature bulb 29A that extends into the evaporator inlet enclosure 13 and is solidly mounted to the metal tubing of the evaporator at a convenient point noted to be generally warmer than other locations on the evaporator during operation. Finally the control components include a buzzer relay 61, a buzzer 36 and a buzzer enable switch 37.

Referring to FIG. 8, three additional attachments are included in the herein-described heat pump system in order to re-configure the heat pump system for air conditioning in the summer. These are;
1) a cold-side cover 70 for the cold-side filter box 11,
2) an evaporator outlet cover box 72 for the evaporator outlet enclosure 14, including an evaporator outlet cover box fitting 72A, and
3) a hot-side cover box 74 mounting atop hot-side enclosure 19 and providing a set of seven hot-side cover box outlet fittings 74A through 74G.

As depicted by air routing differences between FIGS. 5 and 8, the heat pump system is configured for summer or winter operation by modification of air routing. The heat pump system elements that are reconfigured to accomplish this modification are referred to in the claims as "air inflow and handling means" and "air outflow and handling means."

In preparation for summer operation, the components comprising "air inflow and handling means" and "air outflow and handling means" are regrouped and re-arranged to comprise summer air-handling configurations referred to in the claims as "a summer inflow and handling means for living-space air," "a summer inflow and handling means for basement air," "a summer outflow and handling means for living-space air," and "a summer thermal exhaust transfer means."

In preparation for winter operation, the components comprising "air inflow and handling means" and "air outflow and handling means" are regrouped and re-arranged to comprise winter air-handling configurations described as "a winter inflow and handling means for living-space air," "a winter inflow and handling means for basement air," "a winter outflow and handling means for living-space air," and "a winter thermal exhaust transfer means."

The following discussion associates each of the above noted air handling configurations to specific heat pump system components shown in FIG. 5 and FIG. 8:

1) Elements referred to as the "summer inflow and handling means for living-space air" are depicted in FIG. 8, and comprise the intake duct 16A, the intake duct 16B, a cold-side cover fitting 70A, a cold-side cover fitting 70B, the cold-side cover 70, the cold-side filter box 11, the cold-side filters 11A and 11B, the cold-side filter box outlet fitting 11C, and the evaporator intake duct 12.
2) Elements referred to as the "summer inflow and handling means for basement air" are depicted in FIG. 8, and comprise the hot-side intake fitting 18A, the hot-side intake fitting 18B, the hot-side filter enclosure 17, and the hot-side filter 17F.
3) Elements referred to as the "summer outflow and handling means for living-space air" are depicted in FIG. 8 and comprise the evaporator outlet cover box 72, an evaporator outlet cover box fitting 72A, and the output duct 21.
4) Elements referred to as the "summer thermal exhaust transfer means" are depicted in FIG. 8 and comprise the hot-side cover box 74, the set of seven hot-side cover box outlet fittings 74A through 74G, and the seven heat pump exhaust ducts 15A through 15G, which are respectively connected to hot-side cover box outlet fittings 74A through 74G.
5) Elements referred to as the "winter inflow and handling means for living-space air" are depicted in FIG. 5, and comprise the intake duct 16A, the intake duct 16B, the hot-side intake fitting 18A, the hot-side intake fitting 18B, the hot-side filter enclosure 17, and the hot-side air filter 17F.
6) Elements referred to as the "winter inflow and handling means for basement air" are depicted in FIG. 5 and comprise the cold-side filter box 11, the cold-side filters 11A and 11B, the cold-side filter box outlet fitting 11C, and the evaporator intake duct 12.
7) Elements referred to as the "winter outflow and handling means for living-space air" comprise the output duct 21.
8) Elements referred to as the "winter thermal exhaust transfer means" are depicted in FIG. 5 and comprise the set of seven heat pump exhaust ducts 15A through 15G, which connect to respective apertures in the evaporator outlet enclosure 14.

Operation

Referring to FIG. 5, in operation, cold-side air is drawn from the basement overhead through cold-side filters 11A and 11B into the triangular air intake box 42. These filters ensure that any suspended dust in the basement air will not clog the evaporator. The cold-side air then passes through the evaporator intake duct 12 into the evaporator inlet enclosure 13. Upon passing through the evaporator, this air is cooled, and is forced by the cold-side blower provided as part of the embedded heat pump (not shown), out the cold air outlet 22D into the evaporator outlet enclosure 14.

Evaporator outlet enclosure 14 has seven outlets each connecting to one of the heat pump exhaust ducts 15A through 15G. These ducts are routed to release cold air in close proximity to the basement slab, and to maximize the area of basement slab from which geothermal heat is drawn. One method shown is to route the air through a wall partition and release it in a separate room of the basement. Such a wall partition is represented as a dashed line 33 in FIG. 2B. A second method, preferably used in combination with the first method, is to release the air by means of platform ducts such as items 44, 45, and 47 shown in FIG. 2A and FIG. 2B. Each platform duct has its underside open to the slab allowing heat pump exhaust to be channeled in close contact with the concrete slab. A typical platform duct is sealed by weather-stripping and/or caulking along the length of its outside support rails, as previously described with respect to FIG. 2A. This prevents cold air from migrating out from under the platform duct when the heat pump is turned off in the summer. If such cold air migration should occur, it would tend to draw more humid air into the platform ducting, leading to condensation and mildew under the platform ducting. For similar reasons, platform duct air outlets such as 47G are elevated above the level of adjacent ducting. As a result, cool air will tend to pool in the platform ducting during the summer, without engendering a continuous migration of warmer replacement air, which might lead to condensation.

In operation, the platform ducting isolates heat pump exhaust against the slab increasing the temperature difference across the slab and the ability to use the slab as a thermal source for heat pump operation. Platform ducts are installed around the perimeter of basement rooms and especially along the foot of walls at the perimeter of the basement slab. Due to the geometry of the foundation and soil moisture conditions, ducts at the perimeter of the slab are more effective when using the slab as either a heat sink or cold sink. In the winter, air released from the platform ducts will be colder than other air in the basement and will stratify in close proximity to the floor. This will also increase thermal transfer, and the effectiveness of the slab as a ground source for heat pump operation. Finally the platform ducting also provides convenient space for storage, and in combination with the ability of the system to reduce mold and mildew when operating in the summer, greatly enhances the use-ability of the basement.

By releasing air from the platform ducts to the basement ambient, and by drawing its thermal supply air from the basement ambient, the system also allows other heat sources to be exploited, such as waste heat from furnace operation or heat radiated from the basement overhead. After incremental warming due to these available heat sources, the air is eventually returned to the evaporator.

As cold-side air is cooled in the evaporator, heat taken from that air is added to the hot-side air flowing through the condenser. The window A/C condenser fan powers the hot-side air stream. Referring to FIG. 1 or FIG. 5, hot-side air is drawn from the upstairs living space through intake ducts 16A and 16B into the filter enclosure 17, where it passes through the hot-side air filter 17F, exits filter enclosure 17 through bottom holes such as 17A, and passes through matching holes such as 19A to enter hot-side enclosure 19. Hot-side partition 20 guides the air into the condenser intake grilles of the window A/C. The air then passes through the window A/C fan and condenser, where it gains heat transferred by the Freon piping loop from the evaporator. Heated air passes out of the hot-side enclosure 19 and is transferred back to the upstairs living space via output duct 21.

FIG. 6 depicts an electrical control circuit that activates the herein-described heat pump system in response to a call for heat, and de-activates it when the call for heat is satisfied. The control circuit also provides means to prevent or recover from a freezing condition affecting the heat pump evaporator.

The following discussion assumes that as an initial starting condition the heat pump system is "Off," with power cut-off switch 59 contacts open, buzzer enable switch 37 contacts closed, embedded heat pump control switch 22E "Off," adjustable evaporator temperature switch 29 contacts closed, evaporator air flow switch 28 contacts open, heating and air conditioning thermostat 52 in heating mode and "calling for heat" with contacts closed, and embedded heat pump temperature bulb-driven contacts 22G open.

To begin heating system operation, power cut-off switch 59 is switched to the ON position, and the adjustable timer is rotated to immediately cause power to be applied to transformer 50, and therefore to adjustable evaporator temperature switch 29. Switch 29 is normally closed and will open on falling evaporator temperature should a freezing condition develop. Power will therefore be applied to evaporator air flow switch 28 which will be open since no air is yet flowing. With no power through the terminals of the air flow switch 28, buzzer relay 61 will be de-energized; connecting power directly across the buzzer 36 and buzzer enable switch 37. Given a buzzer enable switch position of closed, the buzzer will activate. Next, the AC control is switched to "Hi Cool". This will activate the AC fan and blower, closing the contacts of the evaporator air flow switch 28 and energizing buzzer relay 61. The buzzer 36 will then shut off. If thermostat 52 is calling for heat its contacts will be closed, and power will then be applied to the temperature bulb override heater 55. In 4 to 5 minutes the temperature bulb override heater will apply enough heat to the AC temperature bulb 22F to cause its driven contacts 22G to close on rising temperature. At that point the AC compressor will activate and the system will begin producing heat.

In normal operation, water may gradually freeze on the evaporator eventually causing a partial or complete loss of efficiency. This process is relatively slow and predictable and is managed by means of the adjustable timer 58. Given a setting of 45 Min—ON, 15 Min—OFF as indicated in FIG. 6, the timer will cut power to the transformer every 45 minutes. This will immediately cut power to the temperature bulb override heater, and the temperature bulb will then begin cooling. The evaporator air tap 53 will accelerate this cooling process by creating air circulation around the temperature bulb 22F and override heater 55. This occurs due to evaporator airflow moving past circumferential restrictor 53C, causing low pressure to draw basement ambient air in through the temperature override vent tube 54. When temperature bulb 22F cools, the compressor will shut off, but the AC blower will continue running. This will remove any freezing condensate from the evaporator before the timer engages the temperature bulb override heater 55 to begin a new run cycle.

If an initial timer "On" duration is established which is too long given basement temperature and humidity conditions, then a freezing condition will begin to occur in the evaporator before the timer "On" cycle is complete. If this occurs, the adjustable evaporator temperature switch 29 will open on falling temperature. This will cut power to the temperature bulb override heater 55 and also cut power to buzzer relay 61, activating buzzer 36. The activation of the buzzer allows the operator to recognize that the timer adjustment is not adequate and re-adjust the timer accordingly. Eventually, this will result in a timer setting that is effective, allowing the evaporator temperature switch to operate only as a backup.

For additional safety, an optional air flow switch is also provided in the design of the current embodiment. This switch has the same effect as the evaporator temperature switch.

In summer operation, the possibility of freezing may also exist, should filters become clogged or if airflow becomes restricted. Therefore, an air tap shut-off valve 53B is provided which blocks flow of cold evaporator air and re-directs it into the temperature bulb override enclosure 27. This lowers the temperature within the enclosure enough to ensure that the embedded heat pump temperature bulb driven contacts 22G will open on falling temperature when the temperature bulb override heater is shut off due to a developing evaporator freeze condition. In all other respects, the operation of the system is the same as described for winter.

Operating in air conditioning mode the herein-described heat pump system lowers the humidity in the house, and uses the basement slab as a heat sink, which also tends to lower basement relative humidity and reduce basement mold and mildew. FIG. 8 depicts ducting attachments needed to reconfigure the system for air conditioning.

With attachments 70, 72, and 74 installed, the following method is used to configure the herein-described heat pump system for cooling in the summer:
1) Re-attach intake ducts 16A, and 16B to the cold-side cover fittings 70A and 70B respectively,
2) Re-attach heat pump exhaust ducts 15A through 15G to hot side cover box outlets 74A through 74G respectively.
3) Re-attach output duct 21 to evaporator outlet cover box outlet 72A.
4) Shift the evaporator air tap shut-off valve to the summer (AC) position.

After reconnection as described above, the herein-described heat pump system will deliver upstairs living space air through intake ducts 16A and 16B to the cold-side cover 70, via the cold-side cover fittings 70A and 70B respectively. The air is then drawn through the cold-side filters 11A and 11B and to the evaporator inlet enclosure 13 via the evaporator intake duct 12, which remains connected as previously described for heating operation. The air then passes through the evaporator, is cooled, and is exhausted by the cold-side blower, exiting from evaporator outlet cover box 72 into output duct 21. Instead of returning heated air to the living space as previously described, output duct 21 will now return air-conditioned air to the living space.

With regard to hot-side air flow, basement air will now be drawn directly into hot-side intake fittings 18A and 18B, providing a thermal supply for heat pump operation. This thermal supply air will then pass through the condenser as previously described for heating operation, except it will now exit via hot-side cover box outlets 74A to 74G. These outlets are attached to heat pump exhaust ducts 15A through 15G, which direct heated air to platform ducts such as those depicted by FIG. 2A and FIG. 2B. Platform ducts channel the heated air along their length in close contact with the basement slab concentrating the warmth along the perimeters of the basement slab, where condensation and mildew might otherwise be likely. Therefore, the basement slab will serve as a heat sink while the system operates in air conditioning mode.

While the herein-described heat pump system operates in air conditioning mode, the temperature of the basement ambient will rise to temperatures comparable to that of the air-conditioned living space. This will result in a decrease in relative humidity in the basement. Since air conditioning is frequently not a priority at night for many houses, the system can be shut down at night allowing the basement and basement slab to return to previous temperatures. Since the system will use relatively cool air as input, it will operate at high efficiency. Therefore, by reducing the need to run other air conditioning units, the overall electric expense for air conditioning will be reduced.

Conclusion, Ramifications and Scope

FIG. 9 depicts key benefits of the herein-described heat pump system including an increase in the flow rate of geothermal heat across the slab, and the recapturing and harnessing of waste heat sources, including radiant heat that would ordinarily be lost by radiation and parasitic convection to the basement walls. FIG. 9 depicts these benefits by showing basement heat flows before and after the installation of the herein-described heat pump system.

As shown in the top view in FIG. 9, un-insulated basement walls create cold air and form a downdraft, creating a parasitic convection loop that causes heat from a number of sources to be lost by convection and conduction to the basement walls.

FIG. 9 depicts parasitic convection by arrows shaded, grey. Convective and radiated heat sources that tend to be lost to such parasitic convection are depicted as white arrows for convective heat flows, downward facing chevrons for radiated heat flow, and dotted arrows representing conducted heat from the basement ceiling or living space floor.

The bottom view in FIG. 9 depicts heat flows in the basement after the installation of the herein-described heat pump system. This view also depicts the impact of basement wall insulation 30, and basement ceiling insulation 48. All of these methods tend to assist in home heating, but will have increased effectiveness when used in combination with the herein-described heat pump system. Finally, FIG. 9 depicts an additional method that uses platform ducting along the foot of basement walls or around the perimeter of basement rooms.

As depicted in the FIG. 9 bottom view, the cold draft coming off of the basement wall is reduced by wall insulation 30. This reduces the amount of cold air flowing across the basement slab, increasing the geothermal capacity available for use by the herein-described heat pump system. The reduction of downdraft from the basement walls also increases the amount of warmer air in the basement overhead available for use by the herein-described heat pump system. In operation, the herein-described heat pump system draws upon warmer air in the basement overhead, extracts heat from it and exhausts colder air in close contact with the basement slab. Cold air outlets are directed to different sections or rooms of the basement to increase the area of the slab from which geothermal heat is drawn. After drawing heat from the basement slab, the air will rise by convection where it will mix with waste heat from other sources in the basement such as the furnace or dryer for example. Eventually this air is returned to the basement overhead where it is available again to be drawn into evaporator outlet enclosure for re-use by the heat pump system.

As depicted by FIG. 9, the basement of an ordinary home generally imposes an overall heat loss. By capturing waste heat before it is lost to the basement walls or radiated to the basement floor, and by encouraging increased geothermal heat flow through the basement slab and harnessing other available sources; the herein-described heat pump system reverses this heat loss, providing a substantial assist for home heating.

While my above description contains many specificities, these should not be construed as limitations on the scope, but rather as an exemplification of one embodiment. Other variations are possible, for example, a system of manually controlled dampers might be provided, eliminating the need to disconnect, re-route, and reconnect ducts in order to shift the system from heating to air conditioning or vice versa.

Accordingly the scope should be determined not by the embodiment illustrated, but by appended claims and their legal equivalents.

The invention claimed is:

1. A heat pump system for a house, said house having a basement and a foundation, said foundation including a footing and a plurality of basement outer walls supported thereon, said basement substantially embedded in locally surrounding subsurface material and ground, said house also having an above-ground living space adjoiningly atop said basement, said above-ground living space enclosing a volume of living-space ambient air, said basement having a floor comprising a concrete slab disposed atop an underlying grade, said concrete slab having an upward-facing surface and a downward-facing surface, said downward-facing surface of said concrete slab being substantially un-insulated with respect to said underlying grade, said basement enclosing a volume of basement ambient air, said heat pump system drawing input living-space air from said volume of living-space ambient air, heating said input living-space air, and returning the heated living-space air to said above-ground living space as heat pump system output air, said heat pump system separately drawing in thermal supply air, causing an imposed temperature change to said thermal supply air, and releasing said thermal supply air having said imposed temperature change as heat pump thermal exhaust, said heat pump system comprising:

a. a single-package heat pump, located in said basement and comprising:
  1. an evaporator fed by a suitable supply of evaporator input air and releasing chilled evaporator output air,
  2. a condenser fed by a suitable supply of condenser input air and releasing heated condenser output air,
  3. means for powering the movement of evaporator input air through said evaporator, and
  4. means for powering the movement of condenser input air through said condenser,
  wherein said means for powering the movement of evaporator input air and said means for powering the movement of condenser input air are selected from the group consisting of air blowers and air fans,
b. a condenser intake assembly attaching to said single-package heat pump and comprising:
  1. a condenser intake stage and enclosing means configured to route said suitable supply of condenser input air to said single-package heat pump, so that said suitable supply of condenser input air is passed to said condenser, and
  2. a condenser intake aperture means comprising at least one opening in said condenser intake stage and enclosing means, enabling entry of comprising air for said suitable supply of condenser input air,
c. an evaporator intake assembly attaching to said single-package heat pump and comprising:
  1. an evaporator intake stage and enclosing means configured to route said suitable supply of evaporator input air to said single-package heat pump, so that said suitable supply of evaporator input air is passed to said evaporator, and
  2. an evaporator intake aperture means comprising at least one opening in said evaporator intake stage and enclosing means, enabling entry of comprising air for said suitable supply of evaporator input air,
d. a condenser output assembly attaching to said single-package heat pump and comprising:
  1. a condenser output stage and enclosing means for collecting, channeling, and enabling the directed release of a suitable volume of said heated condenser output air, and
  2. a condenser output aperture means including at least one opening to direct and release said heated condenser output air from said condenser output stage and enclosing means,
e. an evaporator output assembly attaching to said single-package heat pump and comprising:
  1. an evaporator output stage and enclosing means for collecting, channeling, and enabling the directed release of a suitable volume of said chilled evaporator output air, and
  2. an evaporator output aperture means including at least one opening to direct and release said chilled evaporator output air from said evaporator output stage and enclosing means,
f. an air inflow and handling means for controllably routing suitable flows of air to said condenser intake assembly and said evaporator intake assembly, comprising:
  1. a winter inflow and handling means for living-space air to deliver a suitable supply of said input living-space air to said condenser intake aperture means and to thereby enable said condenser output aperture means to release heated condenser output air that comprises a thermally-modified output of living-space air, and
  2. a winter inflow and handling means for basement air to deliver a suitable supply of basement ambient air to said evaporator intake aperture means for use as said thermal supply air, said suitable supply of basement ambient air to accordingly be incorporated in said chilled evaporator output air, and released via said evaporator output aperture means as said heat pump thermal exhaust,
g. a thermal exhaust temperature mitigation means contained within said basement and comprising:
  1. a thermal exhaust plenum configured to channel and expose heat pump thermal exhaust so that said concrete slab, said foundation, said underlying grade, and said locally surrounding subsurface material and ground are used as a combined thermal sink, thereby causing said imposed temperature change reflected in said heat pump thermal exhaust to be substantially mitigated, and
  2. a thermal exhaust outlet means providing a suitable method of expelling said heat pump thermal exhaust having mitigated temperature to said volume of basement ambient air,
h. an air outflow and handling means for controlling the routing of air outflows released from said evaporator output aperture means and said condenser output aperture means, comprising:
  1. a winter outflow and handling means for living-space air, to deliver said thermally-modified output of living-space air from said condenser output aperture means to said above-ground living space, so that said thermally-modified output of living-space air is presented as said heat pump system output air, and
  2. winter thermal exhaust transfer means to transfer said heat pump thermal exhaust from said evaporator output aperture means to said thermal exhaust temperature mitigation means,
whereby said heat pump system (a) conducts a substantial thermal exchange with said combined thermal sink so as to substantially mitigate said imposed temperature change reflected in said heat pump thermal exhaust, (b) releases said heat pump thermal exhaust having mitigated temperature to said volume of basement ambient air, and draws said thermal supply air from said volume of basement ambient air so as to directly access otherwise wasted heat and other heat sources available via said volume of basement ambient air, and (c) enables home heating to be supported in an efficient and extended fashion by a embedded heat pump unit having a single-package design.

2. The heat pump system of claim 1 wherein said thermal exhaust plenum comprises:
   a. a horizontal sheet of rigid material supported at a predetermined elevation above said upward-facing surface of said concrete slab, said horizontal sheet having an under-surface, an upper surface, an inlet end bordered by an inlet-end edge, an outlet end bordered by an outlet-end edge, a left-side edge, a right-side edge, a width determining the distance between said left-side edge and said right-side edge, and a length determining the distance between said inlet-end edge and said outlet-end edge, wherein said width and said length of said horizontal sheet are sized to accommodate use of said upper surface of said horizontal sheet for storage purposes in said basement,
   b. a right-outer support rail means for bearing said right-side edge of said horizontal sheet at said predetermined elevation above said upward-facing surface of said concrete slab,
   c. a left-outer support rail means for bearing said left-side edge of said horizontal sheet at said predetermined elevation above said upward-facing surface of said concrete slab,
   d. an insulating layer lining said under-surface of said horizontal sheet and having a downward-facing surface that substantially prevents moving air from contacting said under-surface of said horizontal sheet,
   e. a thermal exhaust inlet means that interfaces with said winter thermal exhaust transfer means and provides at least one aperture located in said inlet end to enable flow of said heat pump thermal exhaust into a thermal exchange volume bounded by said downward facing surface of said insulating layer, said upward-facing surface of said concrete slab, said left-outer support rail, and said right-outer support rail, said thermal exchange volume thereby providing a flow path for heat pump thermal exhaust extending from said inlet-end to said outlet end and bounded respectively on the right and left by said right-outer support rail and said left-outer support rail,
   f. a thermal exhaust sealing means to substantially prevent the escape of air moving within said thermal exchange volume except via said thermal exhaust outlet means, said thermal exhaust sealing means thereby enabling flow of said heat pump thermal exhaust to be directed across said upward-facing surface of said concrete slab, and towards said outlet-end edge, without substantial leakage from said thermal exchange volume,
   g. a brace supporting and stiffening said horizontal sheet so as to allow said horizontal sheet to be used for storage purposes in said basement,
   whereby said thermal exhaust plenum creates close contact and improved heat transfer between said heat pump thermal exhaust and said concrete slab, and concurrently provides a raised platform usable for storage purposes in said basement.

3. The heat pump system of claim 1 wherein said thermal exhaust outlet means comprises at least one thermal exhaust outlet aperture, positioned above the level of air contained within said thermal exhaust plenum, thereby creating means to prevent escape of air by convection from said thermal exhaust plenum, during periods where said heat pump system is inactive and said concrete slab causes cooling and thermal stratification of air having incidental contact with said concrete slab.

4. The heat pump system of claim 1 wherein said thermal exhaust outlet means is configured to direct said heat pump thermal exhaust upon exit from said thermal exhaust plenum, so as to cause incidental contact and increased thermal exchange between said heat pump thermal exhaust and an area of exposed concrete slab in a centralized walking area of the basement.

5. A heat pump system for a house, said house having a basement and a foundation, said foundation including a footing and a plurality of basement outer walls supported thereon, said basement substantially embedded in locally surrounding subsurface material and ground, said house also having an above-ground living space adjoiningly atop said basement, said above-ground living space enclosing a volume of living-space ambient air, said basement having a floor comprising a concrete slab disposed atop an underlying grade, said concrete slab having an upward-facing surface and a downward-facing surface, said downward-facing surface of said concrete slab being substantially un-insulated with respect to said underlying grade, said basement enclosing a volume of basement ambient air, said heat pump system drawing input living-space air from said volume of living-space ambient air, thermally modifying said input living-space air, and returning the thermally-modified living-space air to said above-ground living space as heat pump system output air, said heat pump system separately drawing in thermal supply air, causing an imposed temperature change to said thermal supply air, and releasing said thermal supply air having said imposed temperature change as heat pump thermal exhaust, said heat pump system comprising:
   a. a single-package heat pump, located in said basement and comprising:
      1. an evaporator fed by a suitable supply of evaporator input air and releasing chilled evaporator output air,
      2. a condenser fed by a suitable supply of condenser input air and releasing heated condenser output air,
      3. means for powering the movement of evaporator input air through said evaporator, and
      4. means for powering the movement of condenser input air through said condenser,
      wherein said means for powering the movement of evaporator input air and said means for powering the movement of condenser input air are selected from the group consisting of air blowers and air fans,
   b. a condenser intake assembly attaching to said single-package heat pump and comprising:
      1. a condenser intake stage and enclosing means configured to route said suitable supply of condenser input air to said single-package heat pump, so that said suitable supply of condenser input air is passed to said condenser, and
      2. a condenser intake aperture means comprising at least one opening in said condenser intake stage and enclosing means, enabling entry of comprising air for said suitable supply of condenser input air,
   c. an evaporator intake assembly attaching to said single-package heat pump and comprising:

1. an evaporator intake stage and enclosing means configured to route said suitable supply of evaporator input air to said single-package heat pump, so that said suitable supply of evaporator input air is passed to said evaporator, and
2. an evaporator intake aperture means comprising at least one opening in said evaporator intake stage and enclosing means, enabling entry of comprising air for said suitable supply of evaporator input air, d. a condenser output assembly attaching to said single-package heat pump and comprising:
1. a condenser output stage and enclosing means for collecting, channeling, and enabling the directed release of a suitable volume of said heated condenser output air, and
2. a condenser output aperture means including at least one opening to direct and release said heated condenser output air from said condenser output stage and enclosing means, e. an evaporator output assembly attaching to said single-package heat pump and comprising:
1. an evaporator output stage and enclosing means for collecting, channeling, and enabling the directed release of a suitable volume of said chilled evaporator output air, and
2. an evaporator output aperture means including at least one opening to direct and release said chilled evaporator output air from said evaporator output stage and enclosing means, f. an air inflow and handling means for controllably routing suitable flows of air to said condenser intake assembly and said evaporator intake assembly, comprising:
1. a winter inflow and handling means for living-space air to deliver a suitable supply of said input living-space air to said condenser intake aperture means and to thereby enable said condenser output aperture means to release heated condenser output air that comprises a thermally-modified output of living-space air,
2. a winter inflow and handling means for basement air to deliver a suitable supply of basement ambient air to said evaporator intake aperture means for use as said thermal supply air, said suitable supply of basement ambient air to accordingly be incorporated in said chilled evaporator output air, and released via said evaporator output aperture means as said heat pump thermal exhaust,
3. a summer inflow and handling means for living-space air to deliver a suitable supply of said input living-space air to said evaporator intake aperture means and to thereby enable said evaporator output aperture means to release chilled evaporator output air that comprises a thermally-modified output of living-space air, and
4. a summer inflow and handling means for basement air to deliver a suitable supply of basement ambient air to said condenser intake aperture means for use as said thermal supply air, said suitable supply of basement ambient air to accordingly be incorporated in said heated condenser output air, and released via said condenser output aperture means as said heat pump thermal exhaust,
wherein said air inflow and handling means are configured for winter operation by engaging said winter inflow and handling means for living-space air in combination with said winter inflow and handling means for basement air, and are likewise configured for summer operation by engaging said summer inflow and handling means for living-space air in combination with said summer inflow and handling means for basement air, g. a thermal exhaust temperature mitigation means contained within said basement and comprising:
1. a thermal exhaust plenum configured to channel and expose heat pump thermal exhaust so that said concrete slab, said foundation, said underlying grade, and said locally surrounding subsurface material and ground are effectively used as a combined thermal sink, thereby causing said imposed temperature change reflected in said heat pump thermal exhaust to be substantially mitigated, and
2. a thermal exhaust outlet means providing a suitable method of expelling said heat pump thermal exhaust having mitigated temperature to said volume of basement ambient air, h. an air outflow and handling means for controlling the routing of air outflows released from said evaporator output aperture means and said condenser output aperture means, comprising:
1. a winter outflow and handling means for living-space air, to deliver said thermally-modified output of living-space air from said condenser output aperture means to said above-ground living space, so that said thermally-modified output of living-space air is presented as said heat pump system output air,
2. a winter thermal exhaust transfer means to transfer said heat pump thermal exhaust from said evaporator output aperture means to said thermal exhaust temperature mitigation means,
3. a summer outflow and handling means for living-space air, to deliver said thermally-modified output of living-space air from said evaporator output aperture means to said above-ground living space, so that said thermally-modified output of living-space air is presented as said heat pump system output air, and
4. a summer thermal exhaust transfer means comprising enclosing means to transfer said heat pump thermal exhaust from said condenser output aperture means to said thermal exhaust temperature mitigation means,
wherein said air outflow and handling means are configured for winter operation by engaging said winter outflow and handling means for living-space air in combination with said winter thermal exhaust transfer means, and is likewise configured for summer operation by engaging said summer outflow and handling means for living-space air in combination with said summer thermal exhaust transfer means, whereby said heat pump system (a) conducts a substantial thermal exchange between said heat pump thermal exhaust and said combined thermal sink so as to substantially mitigate the temperature change reflected in said heat pump thermal exhaust, (b) releases said heat pump thermal exhaust having mitigated temperature to said volume of basement ambient air, (c) in winter operation draws said thermal supply air from said volume of basement ambient air thereby incorporating otherwise wasted heat available via said volume of basement ambient air, (e) in summer operation counteracts formation of basement mold and mildew by providing targeted warming of said concrete slab and said foundation, as well as limited warming of said volume of basement ambient air, and, (e) enables home heating and air-conditioning to be supported in an efficient and extended fashion by an embedded heat pump unit having a single-package design.

6. The heat pump system of claim 5 wherein said thermal exhaust plenum comprises:
   a. a horizontal sheet of rigid material supported at a predetermined elevation above said upward-facing surface of said concrete slab, said horizontal sheet having an under-surface, an upper surface, an inlet end bordered by an inlet-end edge, an outlet end bordered by an outlet-end edge, a left-side edge, a right-side edge, a width determining the distance between said left-side edge and said right-side edge, and a length determining the distance between said inlet-end edge and said outlet-end edge, wherein said width and said length of said horizontal sheet are sized to accommodate use of said upper surface of said horizontal sheet for storage purposes in said basement,
   b. a right-outer support rail means for bearing said right-side edge of said horizontal sheet at said predetermined elevation above said upward-facing surface of said concrete slab,
   c. a left-outer support rail means for bearing said left-side edge of said horizontal sheet at said predetermined elevation above said upward-facing surface of said concrete slab,
   d. an insulating layer lining said under-surface of said horizontal sheet and having a downward-facing surface that substantially prevents moving air from contacting said under-surface of said horizontal sheet,
   e. a thermal exhaust inlet means comprising at least one aperture located in said inlet end and enabling flow of said heat pump thermal exhaust into a thermal exchange volume bounded by said downward facing surface of said insulating layer, said upward-facing surface of said concrete slab, said left-outer support rail, and said right-outer support rail, said thermal exchange volume thereby providing a flow path for heat pump thermal exhaust extending from said inlet-end to said outlet end and bounded respectively on the right and left by said right-outer support rail and said left-outer support rail,
   f. a thermal exhaust sealing means to substantially prevent the escape of air moving within said thermal exchange volume except via said thermal exhaust outlet means, said thermal exhaust sealing means thereby enabling flow of said heat pump thermal exhaust to be directed across said upward-facing surface of said concrete slab, and towards said outlet-end edge, without substantial leakage from said thermal exchange volume,
   g. a brace supporting and stiffening said horizontal sheet so as to allow said horizontal sheet to be used for storage purposes in said basement,
   whereby said means to thermal exhaust plenum creates close contact and improved heat transfer between said heat pump thermal exhaust and said concrete slab, and concurrently provides a raised platform usable for storage purposes in said basement.

7. The heat pump system of claim 5 wherein said thermal exhaust outlet means comprises at least one thermal exhaust outlet aperture, positioned above the level of air contained within said thermal exhaust plenum, thereby providing means to prevent escape of air by convection from said thermal exhaust plenum during periods where said heat pump system is inactive and said concrete slab causes cooling and thermal stratification of air having incidental contact with said concrete slab.

8. The heat pump system of claim 5 wherein said thermal exhaust outlet means are configured to direct said heat pump thermal exhaust so as to cause incidental contact and increased thermal exchange between said heat pump thermal exhaust and an area of exposed concrete slab in a centralized walking area of the basement.

9. A method for heating and air conditioning a house, said house having a basement and a foundation, said foundation including a footing and a plurality of basement outer walls supported thereon, said basement substantially embedded in locally surrounding subsurface material and ground, said house also having an above-ground living space adjoiningly atop said basement, said above-ground living space enclosing a volume of living-space ambient air, said basement having a floor comprising a concrete slab disposed atop an underlying grade, said concrete slab having an upward-facing surface and a downward-facing surface, said downward-facing surface of said concrete slab being substantially un-insulated with respect to said underlying grade, said basement enclosing a volume of basement ambient air, said method for heating and air conditioning comprising:
   a. providing a single-package heat pump having an air-fed condenser, an air-fed evaporator, means for powering the movement of air through said air-fed evaporator, and means for powering the movement of air through said air-fed condenser, wherein said means for powering movement of air through said air-fed evaporator, and said means for powering the movement of air through said air-fed condenser, are selected from the group consisting of air blowers and air fans,
   b. providing air handling enclosures attached to said single-package heat pump that comprise a condenser intake assembly having a condenser intake aperture means configured to route air to said air-fed condenser, a condenser output assembly having a condenser output aperture means configured to route air from said air-fed condenser, an evaporator intake assembly having an evaporator intake aperture means configured to route air to said air-fed evaporator, and an evaporator output assembly having an evaporator output aperture means configured to route air from said air-fed evaporator,
   c. providing a winter inflow and handling means for living-space air configured to deliver a suitable supply of air from said volume of living-space ambient air to said condenser intake aperture means, and thereby enable said condenser output aperture means to release a heated output of living-space air,
   d. providing a winter outflow and handling means for living-space air configured to deliver said heated output of living-space air from said condenser output aperture means to said above-ground living space,
   e. providing a summer inflow and handling means for living-space air configured to deliver a suitable supply of air from said volume of living-space ambient air to said evaporator intake aperture means, and thereby enable said evaporator output aperture means to release a chilled output of living-space air,
   f. providing a summer outflow and handling means for living-space air configured to deliver said chilled output of living-space air from said evaporator output aperture means to said above-ground living space,
   g. providing a winter inflow and handling means for basement air configured to deliver a suitable supply of air from said volume of basement ambient air to said evaporator intake aperture means, and thereby enable said evaporator output aperture means to release a stream of heat pump thermal exhaust that comprises a chilled output of basement air, h. providing a summer inflow and handling means for basement air configured to deliver a suitable supply of air from said volume of basement ambient air to said condenser intake aperture means, and thereby enable said condenser output aperture means to release a stream of heat pump thermal exhaust that comprises a heated output of basement air, i. providing a thermal exhaust temperature mitigation means by:
  1. providing a thermal exhaust plenum incorporating a portion of said concrete slab as a bounding side and configured to channel and expose heat pump thermal exhaust so that said concrete slab, said foundation, said underlying grade, and said locally surrounding subsurface material and ground are effectively used as a combined thermal sink, and
  2. providing a thermal exhaust outlet means that enables a suitable method of expelling said heat pump thermal exhaust from said thermal exhaust plenum to said volume of basement ambient air, j. configuring said thermal exhaust outlet means to release and direct said heat pump thermal exhaust so as to enhance thermal contact between said heat pump thermal exhaust and an area of exposed slab in a centralized walking area of the basement, k. providing a winter thermal exhaust transfer means configured to transfer said chilled output of basement air from said evaporator output aperture means to said thermal exhaust plenum, l. providing a summer thermal exhaust transfer means configured to transfer said heated output of basement air from said condenser output aperture means to said thermal exhaust plenum, m. providing means to configure for heating mode by,
  1. disengaging said summer inflow and handling means for living-space air, said summer outflow and handling means for living-space air, said summer inflow and handling means for basement air, and said summer thermal exhaust transfer means, and
  2. engaging in combination said winter inflow and handling means for living-space air, said winter outflow and handling means for living-space air, said winter inflow and handling means for basement air, and said winter thermal exhaust transfer means, n. providing means to configure for air conditioning mode by,
  1. disengaging said winter inflow and handling means for living-space air, said winter outflow and handling means for living-space air, said winter inflow and handling means for basement air, and said winter thermal exhaust transfer means, and
  2. engaging in combination said summer inflow and handling means for living-space air, said summer outflow and handling means for living-space air, said summer inflow and handling means for basement air, and said summer thermal exhaust transfer means, whereby a heat pump system that implements said method for heating and air conditioning a house will (a) conduct a substantial thermal exchange via said concrete slab so as to substantially mitigate the temperature change reflected in said heat pump thermal exhaust, (b) release said heat pump thermal exhaust having mitigated temperature to said volume of basement ambient air while drawing said thermal supply air from said volume of basement ambient air so as to leverage otherwise wasted heat flows present in said volume of basement ambient air, (c) substantially prevent formation of basement mold and mildew as part of summer operation by providing targeted warming of said concrete slab and said foundation, and by providing limited warming of said volume of basement ambient air, and (e) enable home heating and air-conditioning to be supported in an efficient and extended fashion by a generic embedded heat pump unit that comprises a mass-produced, reliable, and low-cost window air conditioner having a generic single-package design.

10. The method for heating and air conditioning of claim 9 wherein said step of providing a thermal exhaust plenum further comprises the steps of:

a. providing a horizontal sheet of rigid material supported at a predetermined elevation above said upward-facing surface of said concrete slab, said horizontal sheet having an under-surface, an upper surface, an inlet end bordered by an inlet-end edge, an outlet end bordered by an outlet-end edge, a left-side edge, a right-side edge, a width determining the distance between said left-side edge and said right-side edge, and a length determining the distance between said inlet-end edge and said outlet-end edge, wherein said width and said length of said horizontal sheet are sized to accommodate use of said upper surface of said horizontal sheet for storage purposes in said basement, b. providing a right-outer support rail means for bearing said right-side edge of said horizontal sheet at said predetermined elevation above said upward-facing surface of said concrete slab, c. providing a left-outer support rail means for bearing said left-side edge of said horizontal sheet at said predetermined elevation above said upward-facing surface of said concrete slab, d. providing an insulating layer lining said under-surface of said horizontal sheet and presenting a downward-facing surface that substantially prevents moving air from contacting said under-surface of said horizontal sheet, e. providing a thermal exhaust inlet means that includes at least one aperture located in said inlet end and enabling the flow of said heat pump thermal exhaust into a thermal exchange volume bounded by said downward facing surface of said insulating layer, said upward-facing surface of said concrete slab, said left-outer support rail, and said right-outer support rail, said thermal exchange volume thereby providing a flow path for heat pump thermal exhaust extending from said inlet-end to said outlet end, said flow path being bounded respectively on the right and left by said right-outer support rail and said left-outer support rail, f. providing a thermal exhaust sealing means to substantially prevent the escape of air moving within said thermal exchange volume except via said thermal exhaust outlet means, said thermal exhaust sealing means thereby enabling flow of said heat pump thermal exhaust to be directed across said upward-facing surface of said concrete slab, and towards said outlet-end edge, without substantial leakage from said thermal exchange volume, g. providing a brace supporting and stiffening said horizontal sheet so as to allow said horizontal sheet to be used for storage purposes in said basement, whereby said step of providing a thermal exhaust plenum enables close contact and improved heat transfer between said heat pump thermal exhaust and said concrete slab, and concurrently provides a raised platform usable for storage purposes in said basement.

11. The method for heating and air conditioning of claim 9 wherein said step of providing a thermal exhaust outlet means includes a step of positioning said thermal exhaust outlet means above the level of air contained within said thermal exhaust plenum, whereby natural cooling and thermal stratification of air contained within said thermal exhaust plenum helps to prevent convective migration of air from within said thermal exhaust plenum while the system is de-energized, and the prevention of said convective migration also helps to prevent condensation and associated mold and mildew that might otherwise develop within said thermal exhaust plenum.

\* \* \* \* \*